(12) United States Patent
Nomoto

(10) Patent No.: US 7,538,451 B2
(45) Date of Patent: May 26, 2009

(54) POWER SUPPLY SYSTEM AND ELECTRONIC DEVICE

(75) Inventor: Kazutoshi Nomoto, Kanagawa (JP)

(73) Assignee: Sony Corporation (JP)

( * ) Notice: Subject to any disclaimer, the term of this patent is extended or adjusted under 35 U.S.C. 154(b) by 596 days.

(21) Appl. No.: 11/146,084

(22) Filed: Jun. 7, 2005

(65) Prior Publication Data
US 2006/0001382 A1  Jan. 5, 2006

(30) Foreign Application Priority Data
Jun. 15, 2004 (JP) .......................... P2004-176695

(51) Int. Cl.
*H02J 7/00* (2006.01)
(52) U.S. Cl. ...................................... 307/66
(58) Field of Classification Search ............ 307/66
See application file for complete search history.

(56) References Cited

U.S. PATENT DOCUMENTS 6,204,633 B1 * 3/2001 Kitagawa ................ 320/128

FOREIGN PATENT DOCUMENTS

| JP | 60-109728 | 6/1985 |
|---|---|---|
| JP | 07-320752 | 12/1995 |
| JP | 08-214453 | 8/1996 |
| JP | 2002-231287 | 8/2002 |
| JP | 2003-098342 | 4/2003 |
| JP | 2003-134691 | 5/2003 |

OTHER PUBLICATIONS

Japanese Office Action dated Jan. 23, 2008 for corresponding Japanese Application No. 2004-176695.
Japanese Office Action issued Oct. 9, 2008 for corresponding Japanese Application no. 2004-176695.

* cited by examiner

*Primary Examiner*—Robert L. Deberadinis
(74) *Attorney, Agent, or Firm*—Rader, Fishman & Grauer PLLC; Ronald P. Kananen

(57) ABSTRACT

An output from a generator section is controlled by a current converter section to be a constant current. Charging and discharging of a power storage section is controlled by a charge/discharge control circuit. Thereby, even in a case where a current value required by a load is high, the case can be dealt with in the manner that, while an output current from the generator section is being maintained constant, the output from the generator section and an output from the power storage section can be caused to function in cooperation with each other. Further, charging and discharging of the power storage section can be performed by a simplified device.

10 Claims, 9 Drawing Sheets

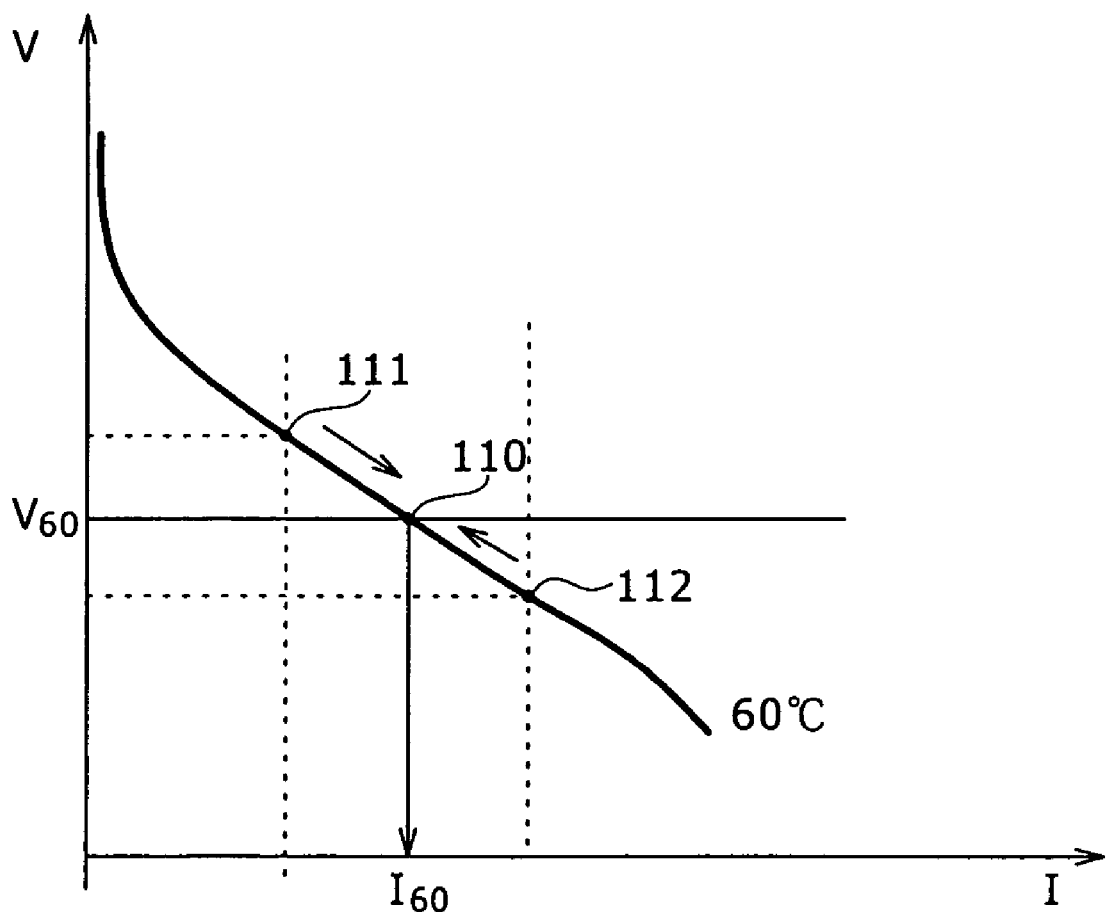

POWER SUPPLY SYSTEM AND ELECTRONIC DEVICE

CROSS REFERENCES TO RELATED APPLICATIONS

The present invention contains subject matter related to Japanese Patent Application JP 2004-176695 filed in the Japanese Patent Office on Jun. 15, 2004, the entire contents of which are incorporated herein by reference.

BACKGROUND OF THE INVENTION

1. Field of the Invention

The invention relates to a power supply system, and more specifically, it relates to a power supply system wherein an output current from a generator section is maintained as constant to thereby secure stable operation of the generator section, and load current fluctuations are selectively compensated for by using an output from a power storage section, thereby enabling the outputs to function in cooperation with each other. In addition, the invention relates to an electronic device including the power supply system.

2. Description of the Related Art

Hitherto, there have been many proposals for power supply systems of the type wherein a power generator, such as a fuel cell or a solar cell, for performing power generation, and a power storage device, such as a secondary cell or a capacitor, for performing charging/discharging operation are combined. Example power supply systems of this type are shown in FIGS. 7A and 7B. For example, in a power supply system shown in FIG. 7A, a load 903 and a power generator 901 are interconnected, and a power storage device 902 is parallel connected to the power generator 901. In addition, in a power supply system shown in FIG. 7B, a constant voltage converter 904 is connected between the power generator 901 and power storage device 902 of FIG. 7A.

However, according to any of these power supply systems, in the event of charging of the power storage device 902, the charge voltage and the charge current are fluctuated by the amount of charge. As such, as shown in FIG. 8, a method has been proposed that uses a constant voltage and constant current converter 905 as a method of charging the power storage device 902.

In systems using a solar cell, a control scheme for operation with an operating point set to a maximum output point from the current and voltage characteristics thereof (MPPT (maximum power point tracker) scheme) is generally employed, whereby a power storage device 902 of the above-described type can be charged with high efficiency. It is known that in a fuel cell, the output current is fluctuated significantly by an external factor, such as the temperature. In many cases where current fluctuations occur in a load 903, the characteristics thereof are influenced significantly, to the extent of hindering a stable operation. As such, it is preferable to capture an output meeting output characteristics that is determined by the environmental conditions thereof.

However, in the case shown in FIG. 8, an output current Icc from the constant voltage and constant current converter 905 takes a value representing the sum of a charge current Ichg and a current Ild demanded by the load 903, that is, Icc=Ichg+Ild. In this case, since the output current Icc from the constant voltage and constant current converter 905 is constant, when the current Ild demanded by the load 903 fluctuates, the charge current Ichg also fluctuates, and care should be taken so that the power storage device 902 is not overcharged.

In addition, the following techniques have been reported. One of them is a fuel cell system (see Patent Document 1 (Japanese Unexamined Patent Application Publication No. 2002-231287), for example). In this case, a fuel cell is directly connected to a load, and the power storage means circuit containing a power storage means is connected parallel with the fuel cell, wherein the power storage means circuit controls a charge current to the fuel cell. Another technique is a hybrid power system (see Patent Document 2 (Japanese Unexamined Patent Application Publication No. 60-109728), for example). In this case, in a hybrid system of a fuel cell containing a switch and a charger cell containing a switch, the switches are controlled to thereby control charging and discharging of the charger cell. Another technique is a DC hybrid supply system (see Patent Document 3 (Japanese Unexamined Patent Application Publication No. 07-320752), for example). In this case, the DC hybrid supply system has a power supply unit connected to a load through a DC/DC converter means, a power storage device parallel connected to the power supply unit, and a DC/DC converter means, wherein a control means controls power supply to the load and charging and discharging of the power storage device.

However, in the fuel cell system according to Patent Document 1, the power storage means is charged by the fuel cell, the regeneration current, and the like. In addition, the control is performed through switching when the amount of stored power is insufficient. As such, the value of charge current to the power storage means and the value of charge voltage to thereto are not controlled. Consequently, the power storage means cannot be charged with a stable current value and a stable voltage value.

In the power system according to Patent Document 2, the control through the on or off operation of the switch is performed in response to the charge status of the charger cell. However, the control through the on or off operation of the switch is not beyond a selection whether or not the charger cell is to be charged, so that the charging voltage, the charging current, and the like to the charger cell cannot be controlled. Further, in the supply system according to Patent Document 3, while only an allowable maximum voltage value and an allowable minimum voltage value of the power storage device are provided, the charge voltage, the charge current, and the like in the charging event are not controlled. Consequently, in the power system according to Patent Document 2 and in the supply system according to Patent Document 3, the charge voltage, the charge current, and the like are fluctuated undesirably by the amount of charge of the charger cell, consequently disabling stable charging.

OBJECTS AND SUMMARY OF THE INVENTION

In view of the above-described actual situations, objects of the invention are to provide:

a power supply system that switches between a power supply only from a generator section and a power supply from both the generator section and a power storage section and that maintains a constant current being output from the generator section, thereby to secure stability;

a power supply system including a generator section that outputs an optimal current value and an optimal voltage value corresponding to the condition of a generator section and that operates stably;

a power supply system capable of safely charging a power storage section; and an electronic device wherein any one of the power supply systems is capable of performing a stable operation.

A power supply system according to one embodiment of the invention includes; a generator section for performing power generation; a current converter section that is connected to the generator section and that controls an output from the generator section to be a constant current, thereby to supply the power to the load; a charging and discharging control circuit that is coupled to an output from the current converter section and that charges a power storage section in a next stage; the power storage section that is connected to the charging and discharging control circuit and that performs charging and discharging; and a control section for controlling the output from the current converter section and an output from the charging and discharging control circuit, wherein when a current value necessary to operate the load is lower than or equal to a current value of the constant current, the power is supplied to the load from the generator section, and the power storage section is charged, and when the current value necessary to operate the load is higher than the current value of the constant current, the power is supplied to the load from both the generator section and the power storage section.

According to another embodiment of the power supply system according to the invention, the output from the generator section is controlled by the current converter section to be a constant current. When the current value demanded by the load is lower than or equal to the constant-current current value, the power is supplied to the load from the generator section and the power storage section is charged. On the other hand, when the current value demanded by the load is higher than the constant-current current value, the power can be supplied to the load from both the generator section and power storage section. That is, in correspondence to a necessary current value, switching can be performed between the output only from the generator section and the outputs from both the generator section and power storage section.

Accordingly, even when the current value demanded by the load is high, while the output current from the generator section is being maintained substantially constant, an output necessary for the load can be supplied by using the output from the power storage section. That is, while a stable operation of the generator section is being secured, a responsive operation can be performed flexibly with respect to the current value demanded by the load.

In addition, an efficient power generation can be implemented in the manner that the control section reads the output current and output voltage produced from the generator section, orders a current value of the constant current ("constant-current current value", hereafter) in correspondence to the operational environment of the generator section, and thereby controls the current converter section. Further, the control section orders a charging current and a charging voltage that are supplied to the power storage section to the power storage section. Accordingly, charging and discharging of the power storage section are controlled correspondingly to the current value demanded by the load, and overcharging thereof is prevented, so that the power storage section can be used in the safe range. Further, the power storage section can be charged and discharged by a simple device.

According to another embodiment of the invention, a power supply system for supplying power to a load includes; a generator section for performing power generation; a current converter section that is connected to the generator section and that controls an output from the generator section to be a constant current, thereby to supply the power to the load; a charging and discharging control circuit that is coupled to an output from the current converter section and that charge a power storage section in a next stage; the power storage section that is connected to the charging and discharging control circuit and that performs charging and discharging; and a control section for controlling the output from the current converter section and an output from the charging and discharging control circuit, wherein when a current value necessary to operate the load is lower than or equal to a current value of the constant current, the power is supplied to the load in a current value higher than the current value necessary to operate the load.

According to the above-described power supply system in accordance with the embodiment, when the current demanded by the load is lower than or equal to the constant-current current value, the generator section is able to output a current value higher than the current value demanded by the load. Thereby, the power storage section can be charged by using an excess current in the current value being output from the current converter section to operate the load.

According to another embodiment of the invention, a power supply system for supplying power to a load includes; a generator section for performing power generation; a current converter section that is connected to the generator section and that controls an output from the generator section to be a constant current, thereby to supply the power to the load; a charging and discharging control circuit that is coupled to an output from the current converter section and that charge a power storage section in a next stage; the power storage section that is connected to the charging and discharging control circuit and that performs charging and discharging; and a control section for controlling the output from the current converter section and an output from the charging and discharging control circuit, wherein when a current value necessary to operate the load is higher than a current value of the constant current, charging of the power storage section is stopped.

According to the above-described power supply system in accordance with the embodiment, charging of the power storage section is stopped. Thereby, a charge of the power storage section can be discharged to the load, and the output from the generator section and the output from the power storage section can be both supplied to the load. Consequently, while a stable operation of the generator section is being secured, the outputs can be cooperatively provided to the load by using the charge discharged from the power storage section, thereby enabling a responsive operation to be flexibly performed correspondingly to the current value demanded by the load.

According to another embodiment of the invention, an electronic device is provided that is connected to a power supply system including; a generator section for performing power generation; a current converter section that is connected to the generator section and that controls an output from the generator section to be a constant current, thereby to supply the power to the load; a charging and discharging control circuit that is coupled to an output from the current converter section and that charge a power storage section in a next stage; the power storage section that is connected to the charging and discharging control circuit and that performs charging and discharging; and a control section for controlling the output from the current converter section and an output from the charging and discharging control circuit, wherein when a current value necessary to operate the load is lower than or equal to a current value of the constant current, the power is supplied to the load from the generator section, and the power storage section is charged, and when the current value necessary to operate the load is higher than the current value of the constant current, the power is supplied to the load from both the generator section and the power storage section.

According to the electronic device in accordance with the embodiment, in correspondence to a necessary current value, switching can be performed between the output only from the generator section and the outputs from both the generator section and power storage section. Accordingly, even when the current value demanded by the electronic device is high, a responsive operation can be performed in the manner that, while the output current from the generator section is being maintained constant, the output from the generator section and the output from the power storage section can be controlled to function in cooperation with each other. Consequently, the electronic device can be operated stably.

Thus, according to the power supply system in accordance with the embodiment, the output current from the generator section is controlled by the current converter section to be the constant current. When the current value demanded by the load is lower than or equal to the constant-current current value, the power is supplied to the load from the generator section and the power storage section is charged. On the other hand, when the current value demanded by the load is higher than the constant-current current value, the power can be supplied to the load from both the generator section and power storage section. That is, in correspondence to a necessary current value, switching can be performed between the output only from the generator section and the outputs from both the generator section and power storage section.

Accordingly, even when the current value demanded by the load is high, while the output current from the generator section is being maintained substantially constant, an output necessary for the load can be supplied by using the output from the power storage section. That is, while a stable operation of the generator section is being secured, a responsive operation can be flexibly performed with respect to the current value demanded by the load.

Further, efficient power generation can be implemented in the manner that the control section reads the output current and output voltage produced from the generator section, orders a current value of the constant-current current value in correspondence to the operational environment of the generator section, and thereby controls the current converter section. Further, the control section orders a charging current and a charging voltage that are supplied to the power storage section. Accordingly, the charging and discharging of the power storage section are controlled correspondingly to the current value demanded by the load, and overcharging thereof is prevented, so that the power storage section can be used in the safe range. Further, the power storage section can be charged and discharged by a simple device.

BRIEF DESCRIPTION OF THE DRAWINGS

The above and other objects, features and advantages of the present invention will become more apparent from the following description of the present exemplary embodiment of the invention taken in conjunction with the accompanying drawings, in which:

FIG. 4 is a diagram showing current and voltage characteristics at 60° C. in a generator section of the power supply system according to another embodiment of the invention;

DETAILED DESCRIPTION OF THE PREFERRED EMBODIMENTS

With reference to the appended drawings, a power supply system according to an embodiment of the invention will be described in detail below. The invention is not limited to the description given below, but the invention may be modified in a multitude of different ways without departing from the scope and spirit of the invention.

Figure 1:
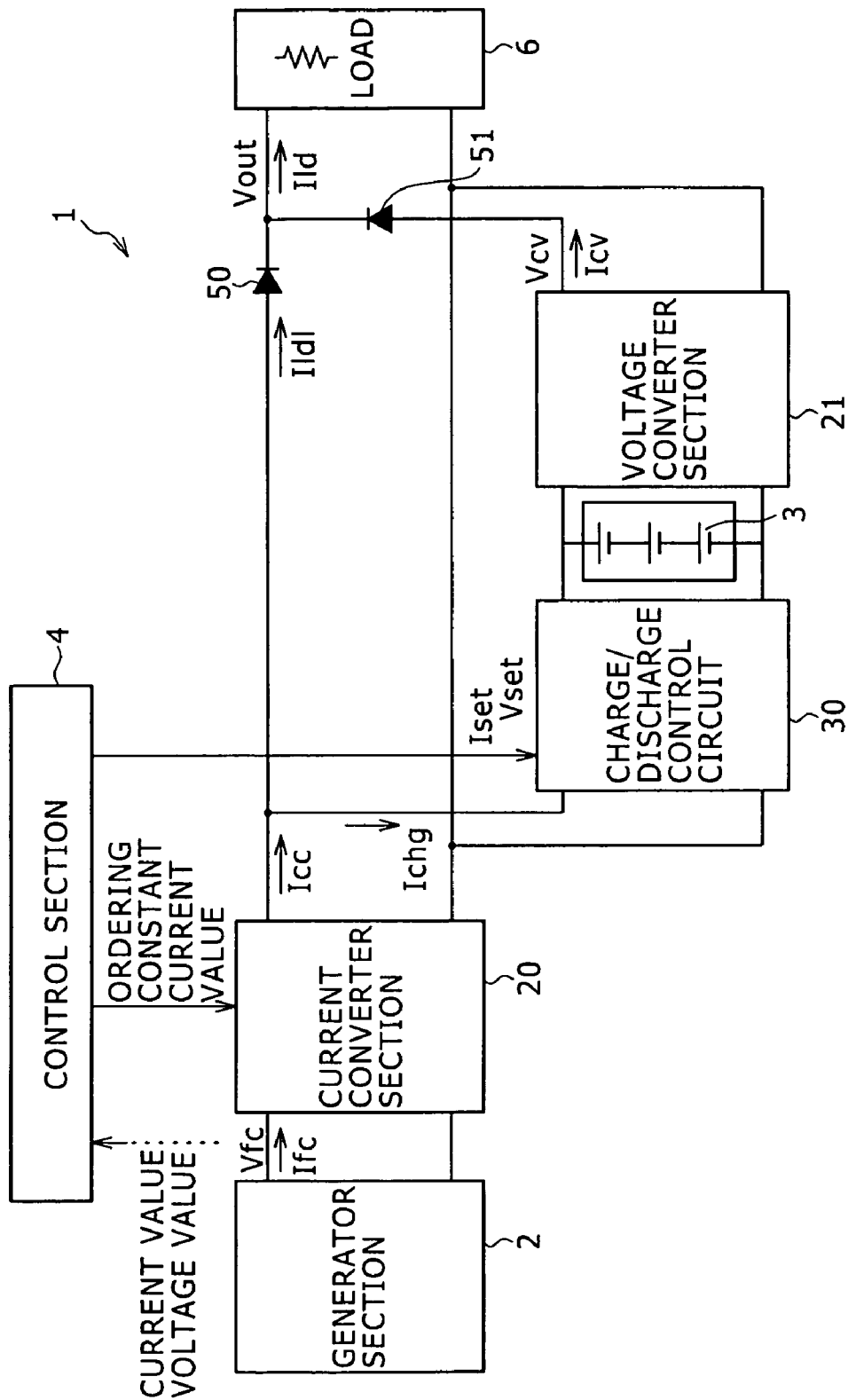
FIG. 1 is a view showing an example configuration of a power supply system according to an embodiment of the invention.

FIG. 1 is a view showing an example configuration of a power supply system according to an embodiment of the invention. A power supply system 1 according to the embodiment of the invention includes; a generator section 2 for performing power generation; a current converter section 20 for controlling an output from the generator section 2 so as to be a constant current; a power storage section 3 for performing charging and discharging; a charge/discharge control circuit 30 for controlling charging of the power storage section 3; a control section 4 for controlling the current converter section 20 and the charge/discharge control circuit 30 by ordering a charging current Iset and a charging voltage Vset to the charge/discharge control circuit 30; and diodes 50 and 51, individually, as current direction restriction means for restricting the directions of current from the generator section 2 and current from the power storage section 3 to predetermined directions.

The generator section 2 is capable of performing power generation, and is connected to a load 6 through the current converter section 20 (described below), thereby to supply power to the load 6 through the current converter section 20. The output current and output voltage from the generator section 2 and the temperature in the generator section 2 are read by the control section 4 (described below).

Examples that are usable as the generator section 2 include a fuel cell, which generates power by being supplied with a fuel, such as hydrogen or methanol, and a solar cell, which generates power by using sunlight. Example fuel cells include, for example, those of an alkali solution type, a phosphoric acid type, a molten carbonate type, and a solid oxide type, and solid polymer. The fuel cell is not limited to the type using hydrogen, methanol, or the like as a direct fuel, but may be, for example, a reformed fuel cell of the type that generates hydrogen by reforming methanol, gasoline, or the like. Thus, the fuel cell may be changed appropriately depending upon the power supply system 1 being formed.

Example solar cells include, for example, a silicone solar cell using silicones, such as a monocrystalline silicone, polycrystalline silicone, and amorphous silicone, and a compound-semiconductor solar cell. Similarly as the fuel cell, the solar cell may be appropriately changed depending on a power supply system 1 being formed.

The current converter section 20 is capable of converting the current and voltage, is disposed between the generator section 2 and the load 6, and is connected also to the power storage section 3 through the charge/discharge control circuit 30. The current converter section 20 is capable of controlling the output from the current converter section 20 so as to be a constant current (the control hereafter will be called "constant-current control") and so as not to output a current value higher than a current value Iconst ordered by the control section 4. In the event that the current value being output from the current converter section 20 is lower than or equal to the current value Iconst, control may be performed to output a substantially constant voltage value Vconst higher than an output voltage Vcv being output from the power storage section 3 through a voltage converter section 21.

The current converter section 20 receives the order for the current value Iconst from the control section 4 that reads the current and voltage being output from the generator section 2. In accordance with the ordered current value Iconst, the current value being output can be controlled so as not to be output at a current value higher than or equal to the current value Iconst. As such, the current converter section 20 can be controlled indirectly by the control section 4.

For example, even in a case requiring a current value with which a current value demanded by the load 6 becomes higher than a current value Iconst of the constant current (hereafter, "constant-current current value Iconst"), the current value of the output from the current converter section 20 is controlled so as to be the current value Iconst. Accordingly, it is sufficient for the generator section 2, which is connected to the current converter section 20, to output a current corresponding to the current value Iconst, and the output current from the generator section 2 can be maintained substantially constant even when the current value demanded by the load 6 increases.

The power storage section 3 is capable of performing charging and discharging. The power storage section 3 is connected to the current converter section 20 through the charge/discharge control circuit 30, and is capable of discharging charge to the load 6 through the voltage converter section 21. Charging and discharging of the power storage section 3 are controlled by the charge/discharge control circuit 30 (described below), and charging is performed by part of the output from the current converter section 20, whereby discharging can be performed correspondingly to the current value demanded by the load 6.

When the current value demanded by the load 6 is lower than or equal to the constant-current current value Iconst, the power storage section 3 is charged with a current remaining after subtraction of the current value demanded by the load 6 from the output current from the current converter section 20. On the other hand, when the current value demanded by the load 6 is higher than the constant-current current value Iconst, outputting to the load 6 from the current converter section 20 is performed, and outputting to the load 6 from the voltage converter section 21 is performed in accordance with the discharge from the power storage section 3. In addition, in accordance with the control by the charge/discharge control circuit 30, the charging current can be controlled in a safe range, so that the power storage section 3 can be charged safely without being overcharged.

The power storage section 3 may be a cell of low electric density, such as a capacitor or an electric double layer capacitor, but alternatively may be a secondary cell of high electric density, such as a lead cell, a lithium-ion cell, a nickel-cadmium cell, a nickel-hydrogen cell, or sodium-sulfur cell. Thus, the power storage section 3 may be appropriately changed depending on the load 6 and the generator section 2 being used and the demanded output. One of the cells may be used alone, but a plurality of the cells may be used in combination.

The charge/discharge control circuit 30 is capable of controlling the charging and discharging of the power storage section 3. The charge/discharge control circuit 30 is disposed between the current converter section 20 and the power storage section 3. In addition, the charge/discharge control circuit 30 converts the output current and output voltage from the current converter section 20 to the respective charging current Iset and charging voltage Vset commensurable with the charging of the power storage section 3, thereby enabling the power storage section 3 to be charged stably. The charging current Iset and the charging voltage Vset are ordered by the control section 4. For the charging voltage Vset, a value lower than the voltage value Vconst from the current converter section 20 operating in a constant voltage range is ordered to the charge/discharge control circuit 30.

In accordance with the control by the charge/discharge control circuit 30, when the current value demanded by the load 6 is lower than or equal to the constant-current current value Iconst, the current converter section 20 operates in the constant voltage range. In this event, the voltage value Vconst being output from the current converter section 20 becomes higher than the charging voltage Vset ordered to the charge/discharge control circuit 30, so that the charging current is supplied to the charge/discharge control circuit 30, whereby the power storage section 3 can be charged.

When the current value demanded by the load 6 is higher than the constant-current current value Iconst, the current converter section 20 operates in a constant current range. In this event, the voltage being output from the current converter section 20 sharply drops so as to be lower than the charging voltage Vset ordered to the charge/discharge control circuit 30. Accordingly, charging current is not supplied to the charge/discharge control circuit 30, and the charging current is stopped from being output from the charge/discharge control circuit 30 to the power storage section 3. Since charging of the power storage section 3 is stopped, the power storage section 3 can be discharged.

Thus, the charge/discharge control circuit 30 is able to control the charging and discharging of the power storage section 3 in accordance with the relationship between the current value Iconst and the current value demanded by the load 6. In addition, the charge/discharge control circuit 30 is able to control the charging current of the power storage section 3 in the safe range, and is able to safely charge the power storage section 3.

The voltage converter section 21 is installed in the position subsequent to the power storage section 3 so as to supply power at a stable voltage to the power storage section 3. Thereby, in the case in which a member requiring voltage-value control is used, the output voltage from the power storage section 3 is controlled so that power can be supplied at a stable voltage to the load 6.

For example, a constant voltage converter for controlling the voltage value may be installed as the voltage converter section 21, but depending on the type of the power storage section 3 being mounted, the voltage converter section 21 may not need to be installed. For example, in the case in which a device capable of outputting a substantially constant voltage without voltage control is mounted as the power storage section 3, the voltage converter section 21, which controls the output voltage from the power storage section 3, does not need to be installed.

The control section 4 reads the output current and output voltage produced from the generator section 2 and the temperature in the generator section 2, and orders the current value Iconst to the current converter section 20 to control the output from the generator section 2 to a constant current in accordance with the current value Iconst. Thereby, the current converter section 20 can be controlled indirectly. In addition, the charging current Iset and the charging voltage Vset can be ordered to the charge/discharge control circuit 30. The values Iconst, Iset, and Vset are ordered in PWM (pulse width modulation) values or a voltage value.

With the constant-current current value Iconst being ordered by the control section 4, the output to the power storage section 3 from the charge/discharge control circuit 30 is controlled correspondingly to the relationship between the constant-current current value Iconst being output from the current converter section 20 and the current value demanded by the load 6.

When the current value demanded by the load 6 is lower than or equal to the constant-current current value Iconst being output from the current converter section 20, the current converter section 20 operates in the constant current range. In accordance with the operation in the constant current range, the constant-current current value Iconst being output from the current converter section 20 becomes higher than the charging voltage Vset ordered by the control section 4, whereby the power storage section 3 is charged with the charging current Iset.

On the other hand, when the current value demanded by the load 6 is higher than or equal to the constant-current current value Iconst being output from the current converter section 20, the current converter section 20 operates in the constant current range. In accordance with the operation in the constant current range, the output voltage being output from the current converter section 20 becomes lower than the charging voltage Vset, whereby the charging current is stopped from being supplied to the power storage section 3 from the charge/discharge control circuit 30. Thereby, the charging of the power storage section 3 is stopped, and thereby enabling discharging of the power storage section 3.

Although it is sufficient for the control section 4 to order the values Iconst, Iset, and Vset to, for example, the current converter section 20 and the charge/discharge control circuit 30, the control section 4 may directly control, for example, the current converter section 20 and the charge/discharge control circuit 30. Further, the control section 4 may control, for example, the voltage converter section 21 and a heater 8 which is described below.

By ordering the constant-current current value Iconst to the current converter section 20, the control section 4 is able to control the operation indirectly. Thereby, the generator section 2 also can be operated over all time at optimal operating points.

For example, the generator section 2 is operated in accordance with a MPPT being used in solar cells. However, since a case occurs where the MPPT is not set to an optimal operating point depending on the type of the generator section 2, a different scheme may be used to perform the control. An example scheme other than the MPPT scheme is a scheme wherein the control section 4 is provided with a current-value and voltage-value table indicating optimal operating points corresponding to the temperatures in the generator section 2, thereby controlling the output of the generator section 2.

According to the example scheme, for example, the control section 4 looks up the table responsively to the temperature in the generator section 2, and derives a current value and a voltage value at an optimal operating point corresponding to the temperature in the generator section 2. In accordance with the derived current value and voltage value, a constant-current current value Iconst is ordered to the current converter section 20, thereby to control the current converter section 20. In accordance with the control of the current converter section 20, the output of the generator section 2 is controlled. In this manner also, the generator section 2 can be controlled.

In the generator section 2, the optimal operating point is different depending upon the temperature. As such, the control is performed using the control scheme of the current converter section 20 to be carried out by looking up the table indicative of optimal operating points corresponding to the temperatures in the generator section 2. This enables the generator section 2 to operate over all time at an optimal operating point corresponding to the temperature in the generator section 2.

In addition, depending on the case, the generator section 2 may exhibit current and voltage characteristics different from standard current and voltage characteristics. In such a case, the control section 4 may be configured to detect an operating point which causes stable operation of the generator section 2 under the conditions from a table indicative of optimal operating points. This configuration enables the generator section 2 of the power supply system 1 to operate over all time at the optimal operating point.

Further, the control scheme may be a combination of the control using the MPPT and the control using the table. For example, as described below, the configuration including the heater 8 in the power supply system 1 may be such that while the heater 8 can be heated up to an optimal operation temperature for the generator section 2, the current converter section 20 is controlled using the MPPT during the use of the heater 8, but the current converter section 20 is controlled using the table during a regular operation. According to this scheme, the MPPT is able to control the current value and the voltage value to maximum output values, so that the generator section 2 can be heated rapidly, and an efficient and quick warmup operation can be performed.

The diodes 50, 51 are capable of restricting the direction of current. The diode 50 is installed between the load 6 and the current converter section 20, and the diode 51 is installed between the voltage converter section 21 and the load 6. The diodes 50 and 51, respectively, are able to restrict the direction of the output from the current converter section 20 and the direction of the output from the voltage converter section 21 so that the outputs flow to the load 6. This enables the outputs from both the generator section 2 and power storage section 3 to function in cooperation with each other.

In this case, since the respective output passes through the diodes 50, 51, the voltage value is reduced by VF due to a diode forward voltage. In the present embodiment, the diodes 50, 51 are thus employed as current-direction restricting means, but in the present invention the current-direction restricting means is not specifically limited as long as it is able to restrict the current direction.

The load 6 is a device that operates using the power supply system 1 according to the embodiment of the invention, but it is not specifically limited. The load 6 can be used as, for example, a power source for a cellular phone or motor vehicle, but it need not be a power supply unit dedicated for a specific device or equipment and may be of a replaceable type. In the load 6, switching is performed between power supply only from the generator section 2 and the power supply from both the generator section 2 and the power storage section 3 in correspondence to the relationship between the current value demanded by the load 6 and the constant-current current value Iconst. Thereby, while the stable operation of the generator section 2 is being secured, a responsive operation can be performed with respect to variations in the current value demanded by the load 6.

Figure 2:
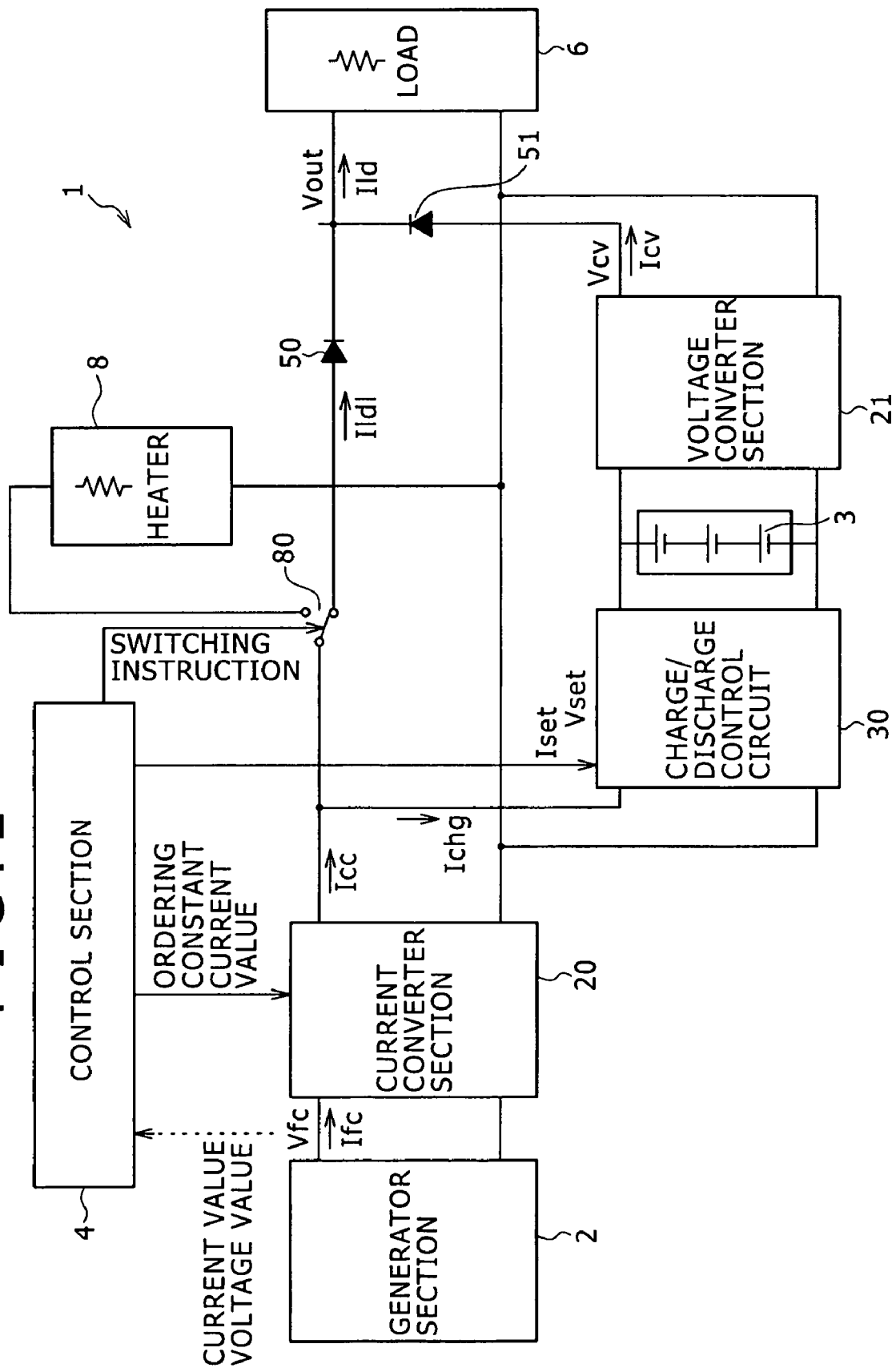
FIG. 2 is a view showing an example configuration of a power supply system including a heater, according to another embodiment of the invention.

In addition, as shown in FIG. 2, the heater 8 may be installed in the power supply system 1. The heater 8 is capable of heating the generator section 2. So that the heater 8 can be used when necessary, a switch 80 may be provided in association with the heater 8 in the power supply system 1. The switch 80 can be actuated by the control section 4 to perform switching.

For example, in a case where, as in the event of startup of the power supply system 1, the temperature in the generator section 2 has not reached a temperature suited for power generation, the temperature in the generator section 2 can be raised by actuating the heater 8. As long as it is capable of heating the generator section 2, the heater 8 is not specifically limited. In addition, the installation position is not specifically limited, but it may be between the current converter section 20 and the load 6, for example, as shown in FIG. 2. In this case, since the current converter section 20 is controlled by the control section 4, the output to the heater 8 can be controlled by the control section 4 through the current converter section 20.

In the power supply system 1 configured as described above, the control section 4 orders the constant-current current value Iconst to the current converter section 20, and orders the charging current Iset and charging voltage Vset in the power storage section 3 to the charge/discharge control circuit 30. Thereby, the current converter section 20 and the charge/discharge control circuit 30 are controlled, and switching can be performed between the output to the load 6 only from the generator section 2 and the outputs to the load 6 from both the generator section 2 and the power storage section 3. Thereby, even when the current value demanded by the load 6 is high, a responsive operation can be performed in the manner that while the output current from the generator section 2 is being maintained constant, the output from generator section 2 and the output from the power storage section 3 can be controlled to work in cooperation with each other.

Figure 3A:
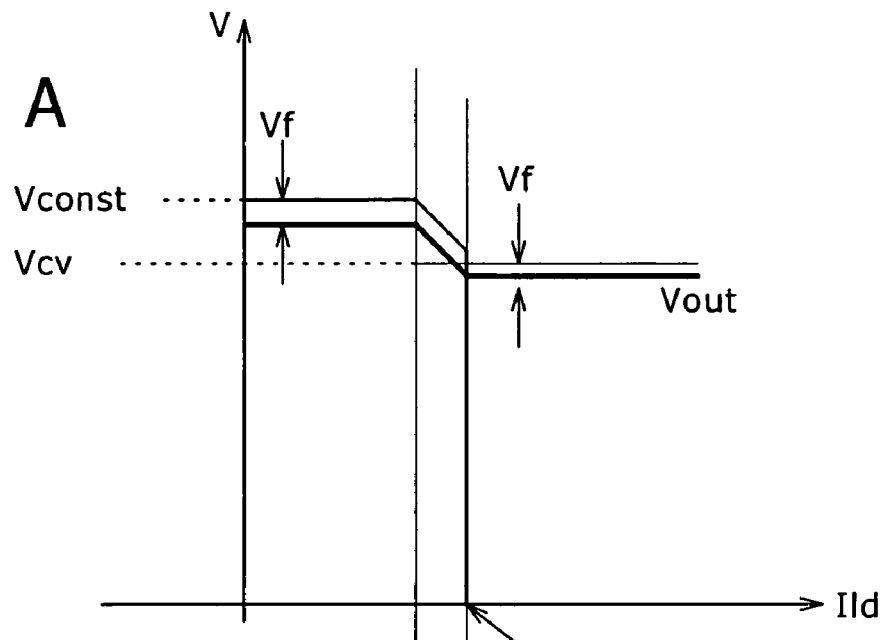
FIGS. 3A and 3B are diagrams showing variations in current values and voltage values of individual component members with respect to a load-demanding current, FIG. 3A showing variations in voltages being output from a current converter section and a power storage section with respect to the load-demanding current, and FIG. 3B showing variations in the current values being output from the current converter section and the power storage section with respect to the load-demanding current.
Figure 3B:
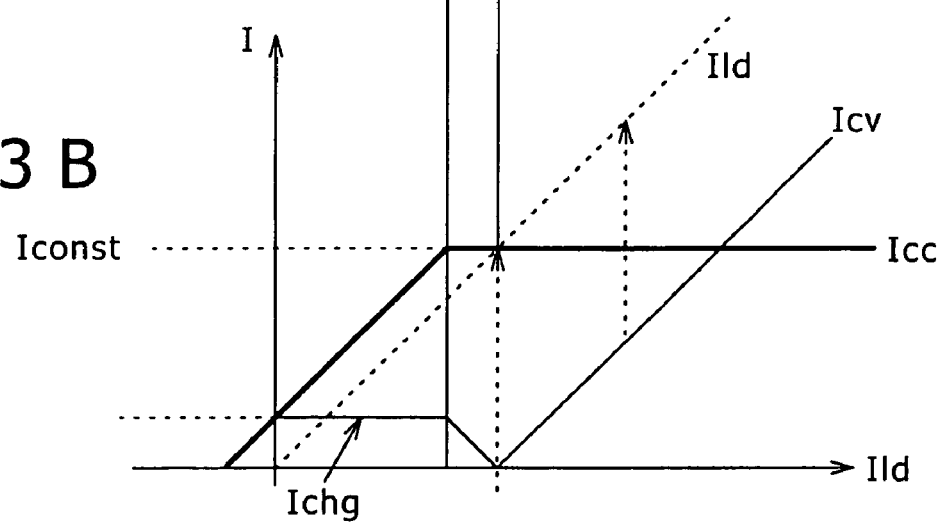

FIG. 3A shows variations in voltage values with respect to the current value Ild demanded by the load, and FIG. 3B shows variations in current values with respect to the current value Ild demanded by the load. The operation of the power supply system 1 according to the present invention will be described by reference to FIGS. 1 to 3.

In the power supply system 1, the control section 4 orders the constant-current current value Iconst to the current converter section 20, and orders the charging current Iset and charging voltage Vset in the power storage section 3 to the charge/discharge control circuit 30. When the current converter section 20 has received the order for the current value Iconst, the current converter section 20 exhibits constant-voltage characteristics or constant-current characteristics, as shown in FIGS. 3A and 3B, in accordance with the relationship between the current Ild demanded by the load 6 and the current value Iconst, and automatic switching is performed therebetween corresponding to the current Ild demanded by the load 6.

More specifically, when the current Ild demanded by the load 6 is lower than or equal to the current value Iconst, the current converter section 20 operates in the constant voltage range that outputs a predetermined voltage value Vconst. On the other hand, when the current Ild demanded by the load 6 is higher than the current value Iconst, the current converter section 20 outputs a constant-current current value ordered by the Iconst control section 4. Then the voltage value drops sharply. In this event, the output demanded by the load 6 can be supplied by a discharge from the power storage section 3, as described below.

When the charging current Iset and the charging voltage Vset are ordered by the control section 4 to the charge/discharge control circuit 30, the charge/discharge control circuit 30 is able to control charging and discharging of the power storage section 3 in accordance with the voltage value being supplied. The charging voltage Vset is a value lower than the constant-voltage charging voltage Vset. When the current converter section 20 is operating in the constant voltage range, that is, the current value Ild demanded by the load 6 is lower than or equal to the current value Iconst, the constant-current current value Iconst being output from the current converter section 20 becomes higher than the charging voltage Vset, and charging current is supplied to the charge/discharge control circuit 30. Thereby, the power storage section 3 can be charged.

On the other hand, when the current converter section 20 is operating in the constant current range causing a sharp drop in the current value output from the current converter section 20, that is, when the current value Ild demanded by the load 6 becomes higher than current value Iconst, the voltage output from the current converter section 20 is lower than the charging voltage Vset. Accordingly, the charging current is stopped from being supplied from the charge/discharge control circuit 30. Thereby, charging of the power storage section 3 is stopped, and a charge is discharged from the power storage section 3 to the load 6. Charging and discharging of the power storage section 3 are automatically switched with respect to each other correspondingly to the current Ild demanded by the load 6.

More specifically, when the current value Ild demanded by the load 6 is lower than or equal to the constant-current current value Iconst, the current converter section 20 operates in the constant voltage range, and the charge is supplied from the generator section 2 to the load 6 through the current converter section 20. In addition, since the voltage value Vconst being output from the current converter section 20 becomes higher than the charging voltage Vset, the charge/discharge control circuit 30 is supplied with the charging current, whereby the power storage section 3 can be charged. In this event, an output voltage Vout to the load 6 takes the voltage value remaining after the diode forward voltage VF due to passage through the diode 50 is subtracted from the voltage value Vconst from the current converter section 20, that is, Vout=Vconst−VF.

In addition, the current Ild being output to the load 6 takes the value remaining after the output current Ichg to the charge/discharge control circuit 30 is subtracted from the output current Icc from the current converter section 20, that is, Ild=Icc−Ichg. In other words, when the current Ild demanded by the load 6 is lower than or equal to the constant-current current value Iconst, the generator section 2 outputs a current value higher than or equal to the current value demanded by the load 6. Thereby, the power storage section 3 can be charged by using the current remaining after the subtraction of the current value Ild demanded by the load 6 from the output current Icc from the current converter section 20, that is, the excess current.

On the other hand, if the current value Ild demanded by the load 6 is higher than the constant-current current value Iconst, the current converter section 20 operates in the constant current range. In this event, the output voltage from the current converter section 20 decreases so as to be lower than the charging voltage Vset ordered by the control section 4. Thereby, the charging current is stopped from being supplied from the charge/discharge control circuit 30, so that charging of the power storage section 3 stops. With the stoppage of the charging of the power storage section 3, a charge is discharged from the power storage section 3 to the load 6.

Accordingly, the charge is output to the load 6 both from the generator section 2 through the current converter section 20 and from the power storage section 3 through the generator section 2 and the voltage converter section 21. In this event, the output voltage Vout to the load 6 takes the voltage value remaining as a result of the subtraction of the diode forward voltage VF due to passage through the diode 51 from the output voltage Vcv, that is, Vout=Vcv−VF. As such, even when the current converter section 20 is operating in the constant current range, the constant-voltage characteristics necessary for the load 6 are secured.

The current Ild being output to the load 6 takes the value obtained from the addition of the output current Iconst from the current converter section 20 and an output current Icv from the power storage section 3, that is, Ild=Iconst+Icv. Thereby, while the stability is being secured by maintaining the output current from the generator section 2 to be substantially constant, and current fluctuations in the load 6 can be compensated for selectively with the current from the power storage section 3.

As described above, even when the output current from the current converter section 20 does not become higher than or equal to the constant-current current value Iconst, and the current value demanded by the load 6 is higher than or equal to constant-current current value Iconst controlled by the current converter section 20, the output current from the generator section 2 can be maintained substantially constant through the interposed current converter section 20. A responsive operation can be performed with respect to the current fluctuations occurring in the load 6 by using the output current from the power storage section 3. As such, the responsive operation can be flexibly performed with respect to the current fluctuations in correspondence to the current value demanded by the load 6 while the stability of the generator section 2 is being secured.

The control section 4 is able to order the constant-current current value Iconst to the current converter section 20 and to order the charging current Iset and the charging voltage Vset to the charge/discharge control circuit 30. Control is performed as described herebelow in correspondence to the relationship between the ordered constant-current current value Iconst and the current Ild demanded by the load 6.

In the event that the current Ild demanded by the load 6 is lower than or equal to the constant-current current value Iconst, power is output to the load 6 and the power storage section 3 is charged by the charge/discharge control circuit 30. On the other hand, in the event that the current Ild demanded by the load 6 is higher than the current value Iconst, charging of the power storage section 3 is stopped by the charge/discharge control circuit 30. Concurrently, power is output from the generator section 2 to the load 6 through to the current converter section 20, and the power storage section 3 discharges and outputs charge to the load 6. Switching between these events is performed automatically.

When the power storage section 3 is sufficiently charged, the charge/discharge control circuit 30 is controlled by the control section 4, thereby to stop charging. Thereby, overcharging of the power storage section 3 can be prevented, and the power storage section 3 can be operated in the safe range.

As described above, the control section 4 orders the constant-current current value Iconst and the charging current Iset and the charging voltage Vset. However, the configuration may be such that the control section 4 directly controls the current converter section 20 and the charge/discharge control circuit 30, and thereby controls the output from the current converter section 20 and the charging and discharging of the power storage section 3.

Figure 8:
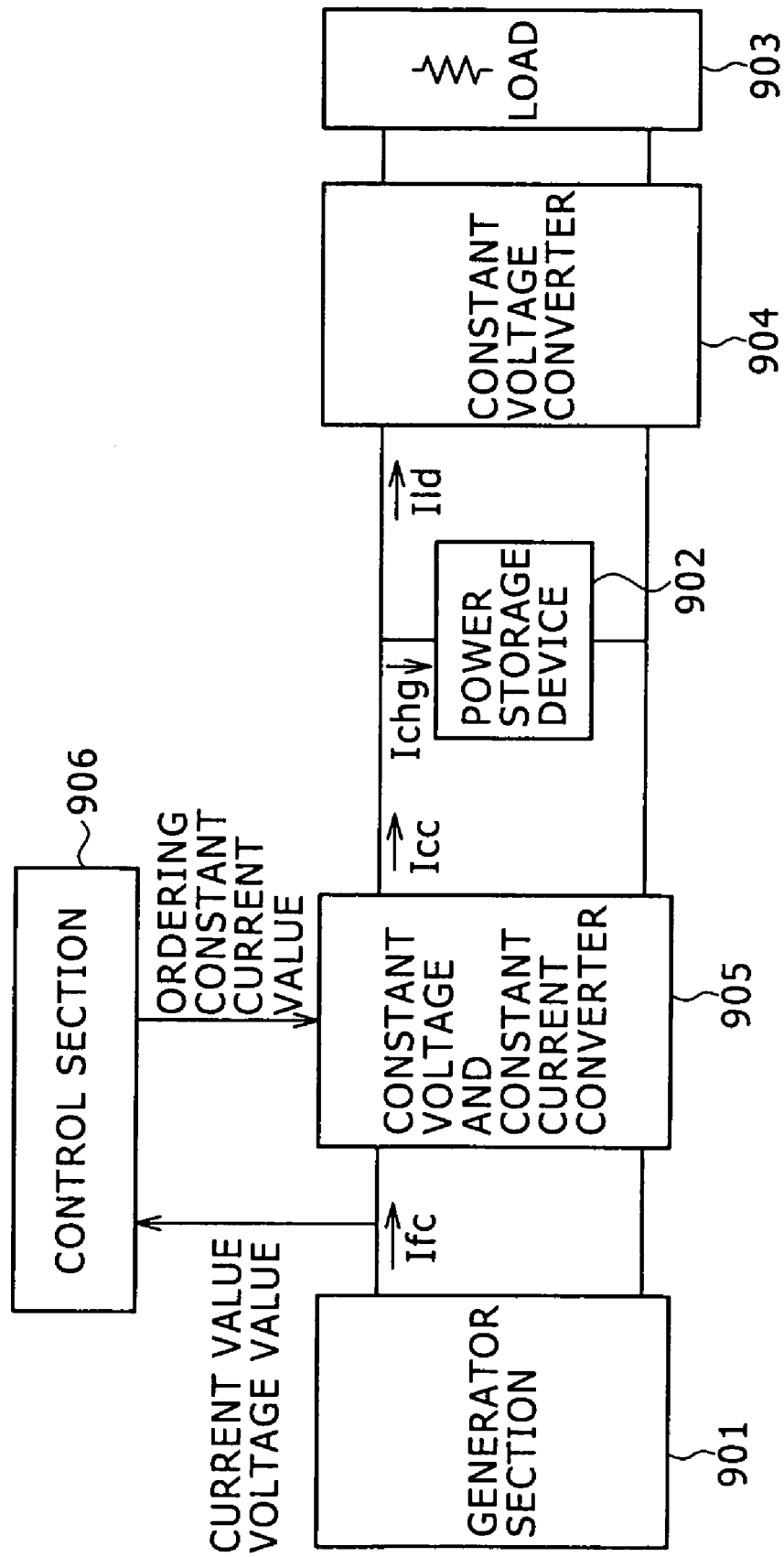
FIG. 8 is a view showing the configuration of a previously proposed power supply system.

The power supply system 1 according to the embodiment of the invention may include the heater 8, as shown in FIG. 8. The heater 8, which may be included in the power supply system 1, may include the heater 8 so as to be usable when necessary. The switch 80 is controlled by the control section 4, thereby enabling the heater 8 to operate correspondingly to the temperature in the generator section 2. When the generator section 2 is lower than or equal to the temperature enabling power generation, the switch 80 is controlled by the control section 4 for connecting to the heater 8. Thereby, the heater 8 becomes able to perform heating by using the output current from the current converter section 20.

For example, with the heater 8 having a resistance value R, since the output current Icc from the current converter section 20 flows thereinto, a power represented by Icc2×R is converted into heat, and the generator section 2 can be heated using that heat.

The heating method may be such that, for example, in the case where a fuel cell using a methanol aqueous solution as fuel is used for the generator section 2, the fuel is heated by the heater 8, and the heated fuel is supplied to the generator section 2, thereby heating the generator section 2. Alternatively, the method may be such that the heater 8 is wound in such a manner as to wrap a stack formed as a sheet. Thus, the heating method for heating the generator section 2 may be changed appropriately.

When the temperature in the control section 4 has reached a temperature suited for power generation, the switch 80 is operated by the control section 4 to stop the heater 8. Thereby, the power supply system 1 according to the embodiment of the invention can be caused to perform the regular operation. Using the heater 8 enables an efficient and quick warmup operation.

In the power supply system 1 according to the embodiment of the invention, the control section 4 has a table indicative of current values and voltage values at optimal operating points corresponding to temperatures in the generator section 2. Thereby, the generator section 2, whose optimal operating point varies depending on the operating environment and the like, can be operated over all time at optimal operating points.

The control section 4 causes variations in the constant-current current value Iconst being ordered to the current converter section 20, thereby being able to control the output from the current converter section 20. The current converter section 20 is connected to the generator section 2, thereby being able to control the output from the generator section 2 in correspondence to the current value demanded by the load 6. Accordingly, the output from the generator section 2 can be controlled in accordance with variations in the value Iconst ordered by the control section 4.

For example, the generator section 2 varies in current and voltage characteristics depending on the temperature therein, so that a look-up access is made to the table indicative of current values and voltage values at optimal operating points corresponding to the temperatures in the generator section 2, which exists in the control section 4, thereby controlling the current converter section 20, and whereby the generator section 2 can be operated at the optimal operating point corresponding to the temperature.

In addition, in the case where the generator section 2 is configured of a fuel cell, for example, the generator section 2 can exhibit current and voltage characteristics different from the standard current and voltage characteristics depending on the fuel density and a time dependent deterioration of an electrolyte membrane. In this case, the control section 4 is able to detect an operating point causing stable operation of the generator section 2 under the conditions from the table indicative of optimal operating points. Thereby, the generator section 2 can be operated over all time at optimal operating points. The control for the above will be described herebelow.

FIG. 4 is a diagram showing current and voltage characteristics at 60° C. in the generator section 2, wherein an optimal operating point at 60° C. corresponds to an operating point 110 indicated by a current value I60 and a voltage value V60. More specifically, when the temperature of the generator section 2 is 60° C., constant-current control is performed with the current value I60 set for the current value Iconst, whereby the generator section 2 can be operated at the optimal operating point.

For example, even when the constant-current control is performed with a current value derived from an operating point 111 or 112 located off the optimal operating point, the generator section 2 does not operate at the optimal operating point. If the generator section 2 were operated at such an operating point other than the optimal operating point, not only the output could not be effectively obtained from the generator section 2, but also the load on the generator section 2 would increase.

The control section 4 reads the output current and output voltage produced from the generator section 2 and the temperature in the generator section 2 all the time, so that the control section 4 is able to detect an offset in the operating point. When such an offset has been detected, control can be performed such that the table indicative of optimal operating points is looked up to derive the operating point 110 at 60° C., and the constant-current current value Iconst is increased or decreased to near the operating point 110.

Figure 5:
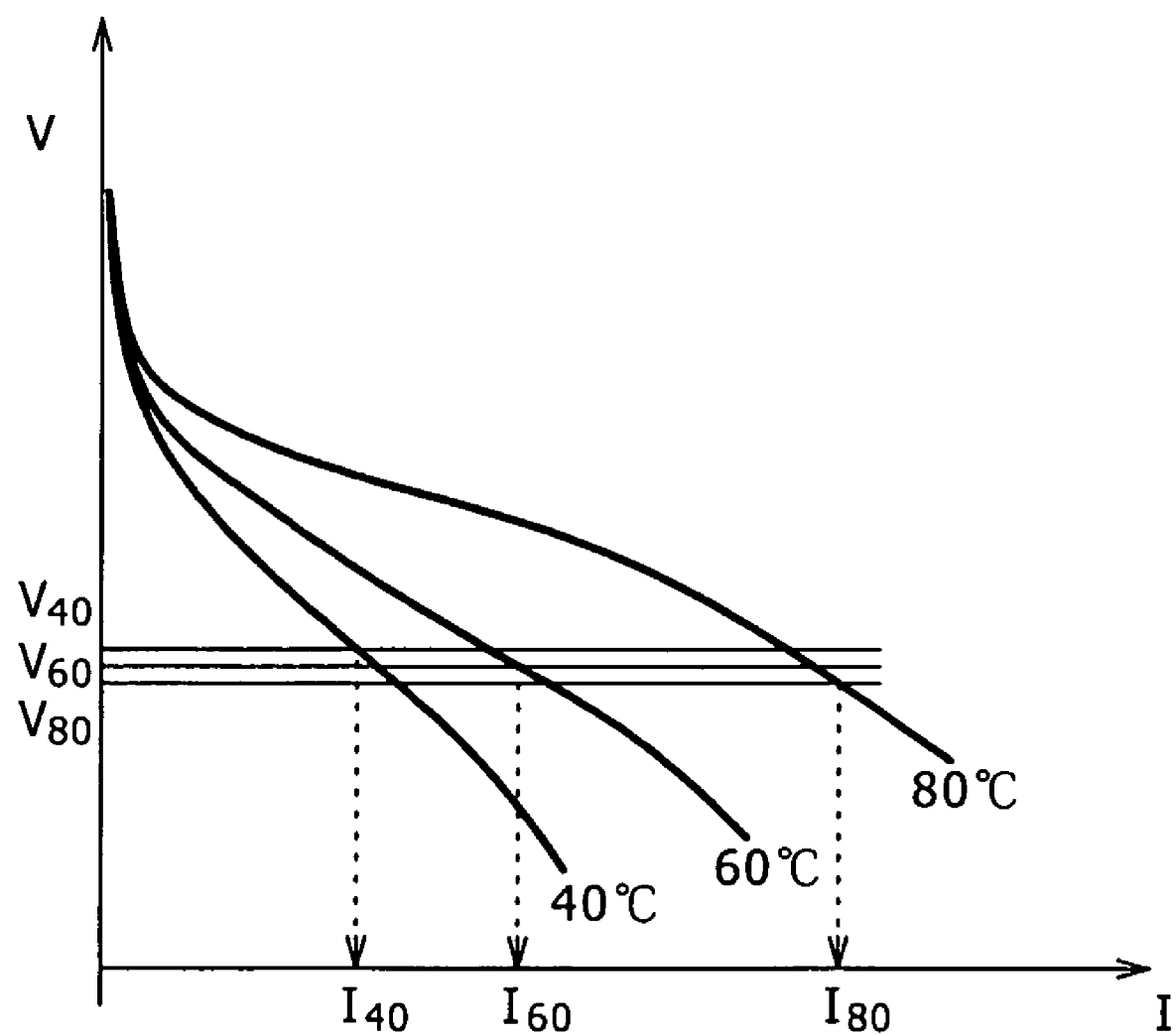
FIG. 5 is a diagram showing current and voltage characteristics at 40° C., 60° C., and 80° C. in the generator section of the power supply system according to another embodiment of the invention.

FIG. 5 is a diagram showing current and voltage characteristics at individual temperatures in a fuel cell in the case that the fuel cell is used as the generator section 2. In FIG. 5, I40 represents a current value and V40 represents a voltage value when the temperature in the generator section 2 is 40° C.; I60 represents a current value and V60 represents a voltage value when the temperature in the generator section 2 is 60° C.; and I80 represents a current value and V80 represents a voltage value when the temperature in the generator section 2 is 80° C. As shown in FIG. 5, it can be known that the current and voltage characteristics are different from one another correspondingly to the temperatures in the generator section 2, and in association therewith, also the optimal operating points are different from one another.

For example, the figure shows that at the temperature of 40° C., while the current value I40 and the voltage value V40 correspond to the optimal operating point, at the temperature of 60° C. the current value I60 and the voltage value V60 correspond to the optimal operating point, and thus the optimal operating points existing at the individual temperatures. The control section 4 has a table indicative of the current values and the voltage values corresponding to the optimal operating points at the individually corresponding temperatures. The control section 4 looks up the table and is able to perform the control with the respective current value being set as the constant-current current value Iconst. Consequently, the generator section 2 can be operated at the optimal operating point.

The control section 4 is able to perform the control described above appropriately. For example, a case can occur where the external temperature decreases, and the temperature in the generator section 2 is decreased thereby. In this case, even when the constant-current control of the current converter section 20 is performed at an optimal operating point from the temperature in the generator section 2, the generator section 2 is operated at an operating point located off the initially controlled optimal operating point.

The control section 4 reads the output current and output voltage produced from the generator section 2 and the temperature in the generator section 2 all the time, so that the control section 4 is able to detect that the generator section 2 is operating at an operating point different from the optimal operating point for the temperature in the generator section 2. When having detected a temperature fall, the control section 4 looks up the table indicative of current values and voltage values at optimal operating points, and is able to control the current converter section 20 to converge to the optimal operating point at that temperature.

In addition, in the case that the heater 8 is mounted, the purpose as described above may be accomplished in the manner that the heater 8 is operated to heat the generator section 2. Thereby, the generator section 2 can be operated over all time at optimal operating points.

Suppose that the current and voltage characteristics are different from the standard current and voltage characteristics because of differences in, for example, the time dependent deterioration of the generator section 2 and the operating environment thereof. In this case, the control section 4 is able to detect a new operating point newly causing the stable operation of the generator section 2 from a current value and voltage value derived from the table indicative of optimal operating points. Accordingly, the generator section 2 of the power supply system 1 can be operated at operating points causing a stable operation all the time, consequently enabling a stable power supply to the load 6.

The following describes an example detection method that is performed by the control section 4 to detect a new operating point. The control section 4, at a predetermined temperature, controls the current converter section 20 in accordance with the current value Iconst by using the table indicative of optimal operating points that is contained in the control section 4. In this event, the control section 4 performs a comparison between the voltage value in the table and the actually output voltage value, thereby being able to detect an offset between the standard characteristics and actual characteristics.

In the case in which the standard characteristics and the actual characteristics are different from each other, even when the current converter section 20 is controlled with an optimal operating point drivable from the table, a desired voltage cannot be obtained. As such, after having detected the offset, the control section 4 is able to shift the operating point to be a new operating point so that a voltage value of the standard characteristics is output. That is, the voltage value at the optimal operating point of the standard characteristics is set as a voltage value of a new operating point, and a current value of the actual characteristics in the voltage value can be set as a current value of the new operating point. Then the current converter section 20 is controlled from the new operating point, whereby the generator section 2 can be operated at the operating point causing stable operation thereof.

Consequently, the generator section 2 can be operated over all time at optimal operating points. New operating points of the type in the above-described event may be preserved in the control section 4 so as to be read out when necessary.

Figure 6:
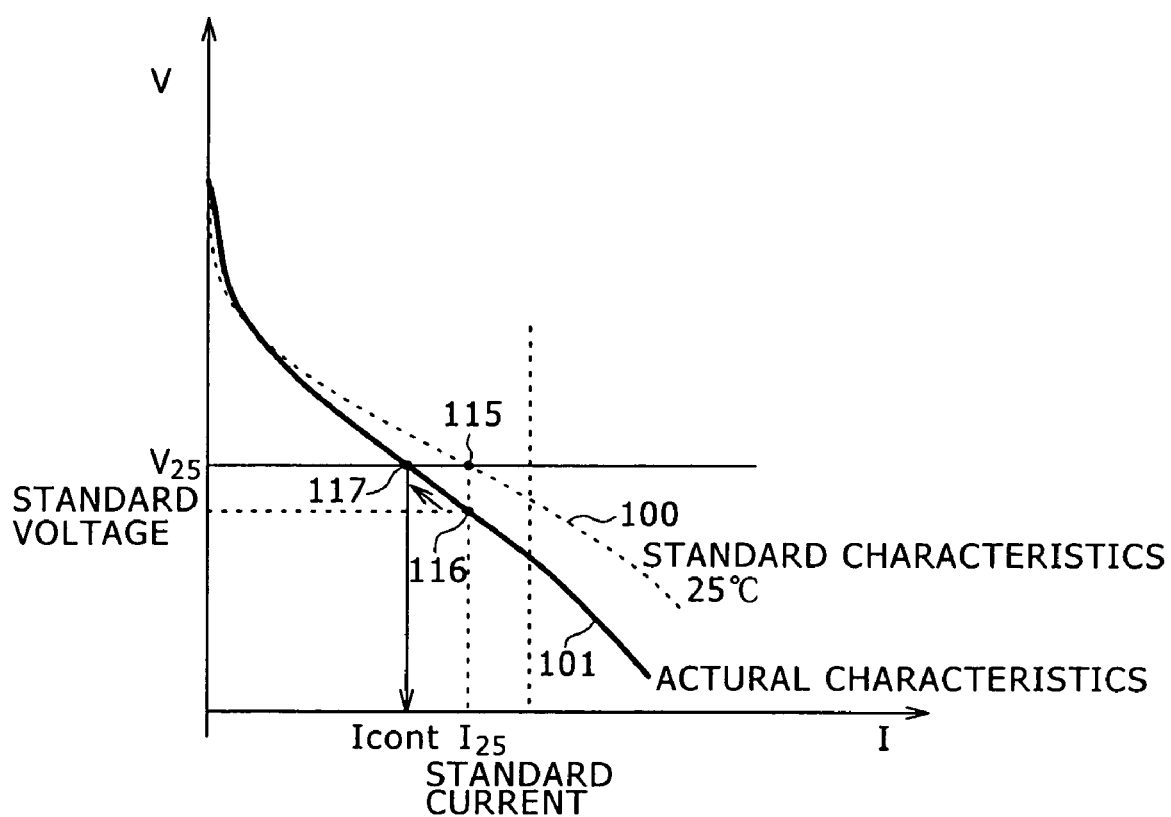
FIG. 6 is a diagram showing standard current, voltage and characteristics and actual current and voltage characteristics at 25° C. in the generator section of the power supply system according to another embodiment of the invention.
Figure 7A:
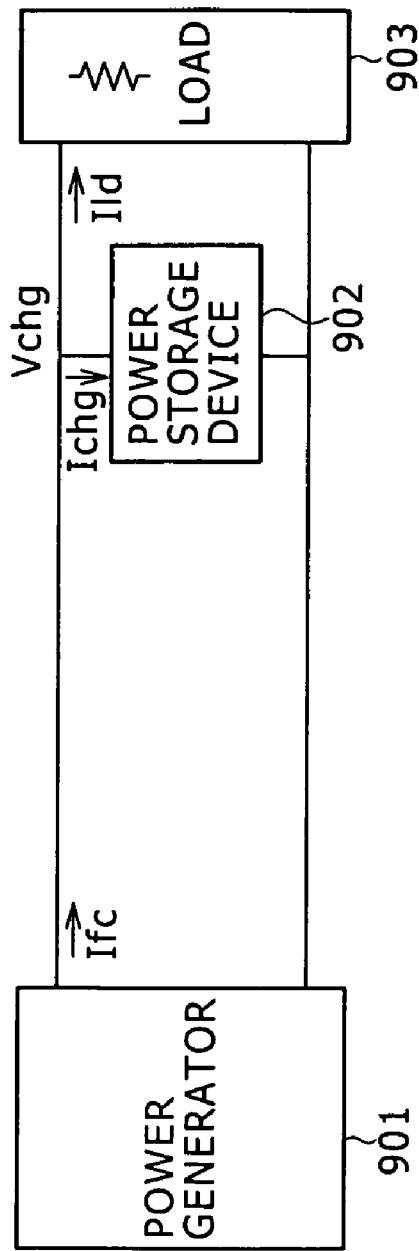
FIGS. 7A and 7B are views showing configurations of previously proposed power supply systems, FIG. 7A showing a most basic configuration of a floating type, and FIG. 7B showing a configuration including a constant current converter.
Figure 7B:
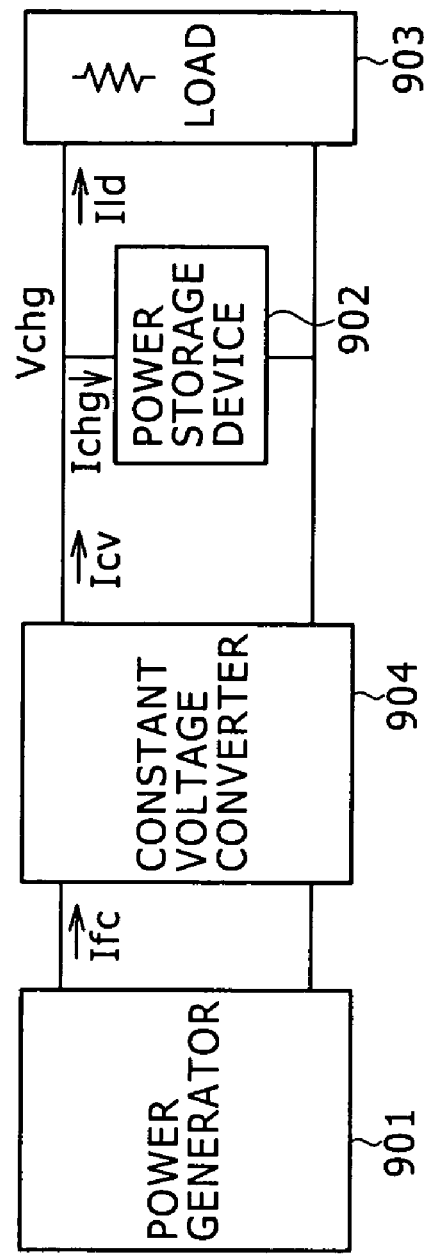

FIG. 6 is a diagram showing standard characteristics and actual characteristics at 25° C. In FIG. 6, I25 represents a current value, and V25 represents a voltage value at the optimal operating point of the standard characteristics at 25° C. The current value and voltage value derived by look-up access to the table indicative of optimal operating points at 25° C. correspond to an operating point 115 indicted by the current value I25 and the voltage value V25, so that the constant-current control is performed with the current value I25. As shown in FIG. 6, in the case where the standard characteristics and the actual characteristics are different from each other, even when the control is performed with the current value I25, the voltage value becomes lower than V25, so that the generator section 2 is operated at an operating point 116.

Upon the detection of an offset of the voltage value, the control section 4 detects a new optimal operating point. The new optimal operating point retains the voltage value V25 at the optimal operating point 115 of the standard characteristics, and is set as an operating point 117 indicated as the current value Iconst in the voltage value V25. The constant-current control is performed in accordance with the new operating point 117, whereby the generator section 2 can be operated at the operating point which causes stable operation.

For example, even in the event that the actual characteristics of the generator section 2 are lower than the standard characteristics, when the value Iconst is reduced, the constant-current control is performed at a point of time at which the current value demanded by the load 6 is even lower, and the power storage section 3 is discharged. Thereby, a power supply system 1 can be provided that is still capable of performing stable power supply even when the actual characteristics of the generator section 2 are diminished.

The control section 4 may be such that the control is performed using not only the above-described table indicative of optimal operating points of the generator section 2, but also by using results of arithmetical operations performed by the control section 4 by using functions constituted of parameters of temperatures or other-than temperatures.

As described above, in the power supply system 1 according to the embodiment of the invention, the output current from the generator section 2 is constant-current controlled by the current converter section 20. When the current value demanded by the load 6 is lower than or equal to the constant-current current value, power is supplied to the load 6 from the generator section 2 and the power storage section 3 is charged. On the other hand, when the current value demanded by the load 6 is higher than the constant-current current value, the power can be supplied to the load 6 from both the generator section 2 and power storage section 3.

That is, in correspondence to the current value demanded by the load 6, switching can be performed between the output only from the generator section 2 and the outputs from both the generator section 2 and power storage section 3. Accordingly, even when the current value demanded by the load 6 has fluctuated, a responsive operation can be performed flexibly. Even when the current value demanded by the load 6 is high, since the constant current is output, a stable operation of the generator section 2 can be secured.

In addition, an efficient power generation can be implemented in the manner that the control section 4 reads the output current and output voltage produced from the generator section 2, orders the constant-current current value Iconst in correspondence to the condition of the generator section 2, and thereby controls the current converter section 20 and the generator section 2. Further, the control section 4 orders the charging current Iset and charging voltage Vset that are supplied to the power storage section 3 to the power storage section 3. Accordingly, charging and discharging of the power storage section 3 are controlled correspondingly to the current value demanded by the load 6, and overcharging thereof is prevented, so that the power storage section 3 can be used in the safe range. Further, the power storage section 3 can be charged and discharged by the simple device.

Figure 9:
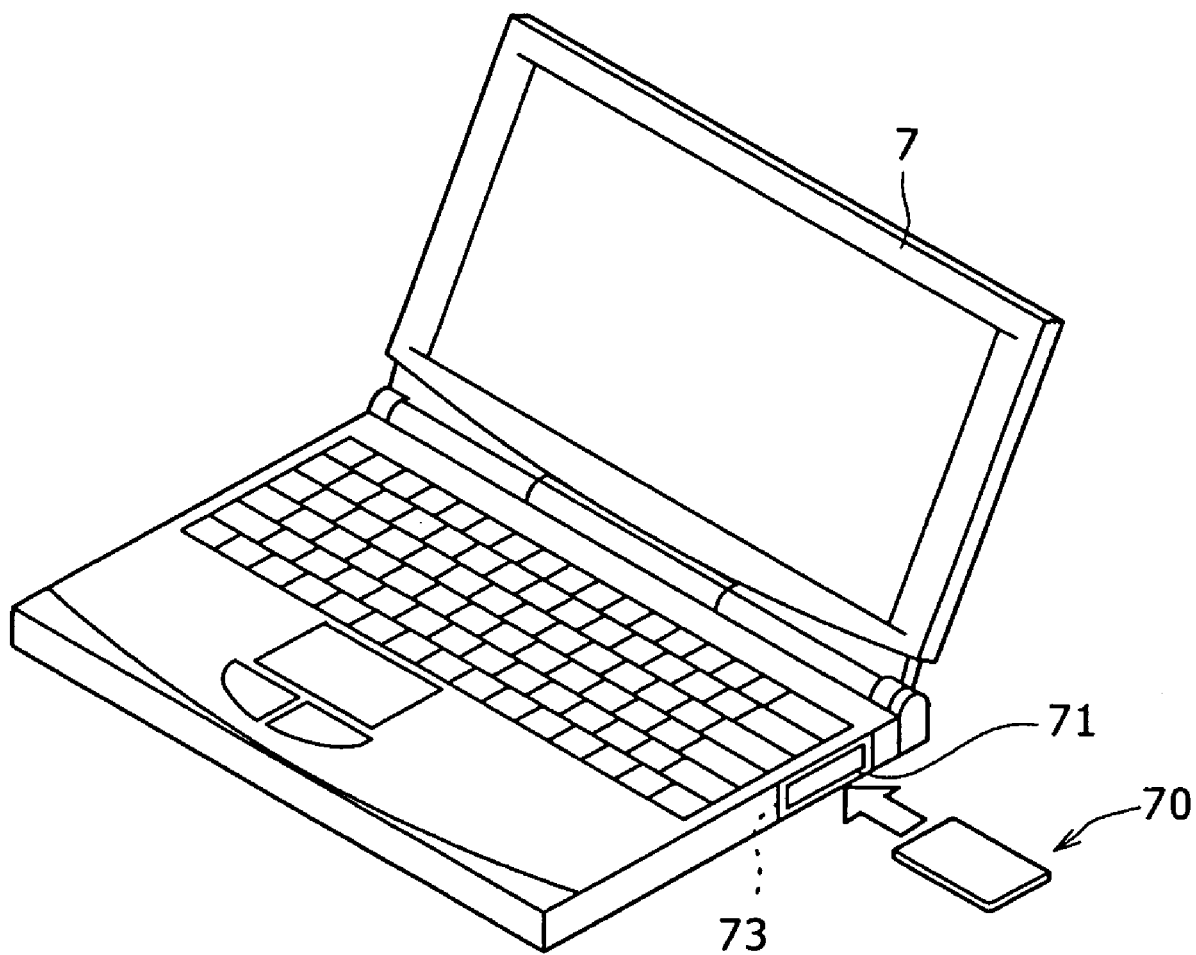
FIG. 9 is a perspective view of the appearance of a notebook personal computer shown by way of an example of an electronic device according to another embodiment of the invention.

As an example electronic device according to the embodiment of the invention, a notebook personal computer will be described herein below with reference to FIG. 9. The power supply system can be, for example, a planar card type, and more specifically, a power supply card 70. As shown in FIG. 9, the fuel cell card is inserted into a card slot 71 of a notebook personal computer 7 to be mounted therein.

The slot 71 may be a slot provided in the housing of a mount body dedicated for the power supply card 70. Alternatively, the slot 71 may be a slot of a standardized size in accordance with JEIDA/PCMCIA. More specifically, the standardized size in accordance with JEIDA/PCMCIA is specified as: vertical dimension (long-side dimension)=85.6 mm±0.2 mm; and horizontal dimension (narrow-side length) =54.0 mm±0.1 mm. The card thicknesses are standardized in Type I and Type II. In Type I, the thickness of the connector portion is 3.3 mm±0.1 mm, and the thickness of the base portion is 3.3 mm±0.2 mm. In Type II, the thickness of the connector portion is 3.3 mm±0.1 mm, and the thickness of the base portion is 5.0 mm or less and a standard size ±0.2 mm of the thickness.

Referring to FIG. 9, the slot 71 is provided in a side portion of the keyboard side of the mainbody of the notebook personal computer 7. However, a portion wherein the slot 71 is provided may be a part of a selectable bay 73 shown by a dotted line in FIG. 9. The selectable bay 73 includes a plurality of functional members attachable and detachable with respect to the notebook personal computer 7, and members built in the selectable bay 73 are replaced when changing extended functions of the personal computer 7. In the case where the power supply card 70 is used, a dedicated adapter may be used as an external device.

The power supply card 70 has an exterior formed into a substantially parallelepiped housing so as to fit into the slot 71. In the housing, the generator section, the current converter section, the power storage section, the charge/discharge control circuit, the control section, and the like are accommodated. Accordingly, the power supply card 70 can be caused to function similarly to the power supply system described above. In an electronic device, such as the notebook personal computer 7, the necessary current value can differ depending on the usage method or the like thereof. As such, with the power supply card 70 being included, it makes it possible to provide an electronic device that switches the outputs corresponding to variations in the current value, thereby being capable of performing a stable operation.

More specifically, in an electronic device, such as a notebook personal computer, the necessary current value is different in, for example, an operating mode and a standby mode. As in the standby mode or the like, in the notebook personal computer 7, when a high current is not necessary, and the necessary current value is lower than or equal to the constant-current current value Iconst being controlled by the current converter section in the housing, power is output only from the generator section to the notebook personal computer 7. In this event, the power storage section in the housing is concurrently charged. On the other hand, in the notebook personal computer 7, when the current value necessary for computational operation and the like is higher than the constant-current current value being controlled by the current converter section, charging of the power storage section is stopped, and power can be received from both the generator section and the power storage section.

That is, in correspondence to the current value demanded by the notebook personal computer 7, switching can be performed between the output only from the generator section and the outputs from both the generator section and the power storage section. Accordingly, even when the current value demanded by the notebook personal computer 7 is high, a responsive operation can be performed in the manner that, while the output current from the generator section is being maintained so as to be constant, the output from the generator section and the output from the power storage section can be controlled to function in cooperation with each other. Consequently, the notebook personal computer 7 can be operated stably.

The power supply card 70 for the notebook personal computer 7 has been described and shown by way of an example, but it is not limited to the example type. For example, the configuration may be such that the power supply system is directly installed inside of a notebook personal computer.

As above, whereas a description has been made with reference to the notebook personal computer as an example of the electronic device according to the embodiment of the invention, the invention is not limited thereto. The invention may be applied to various other devices and machines. They include, for example, portable facsimile machines, personal-computer peripheral instruments and devices, telephones, TV receiver sets, communications devices, mobile terminals, timepieces, cameras, audio and video devices, electric fans, refrigerators, electric irons, electric jars, vacuum cleaners, electric rice cookers, electromagnetic cooking devices, illumination devices, toys such as game machines and radio-controlled cars, electric tools, medical devices, measuring instruments, vehicular on-board devices, business machines, health/beauty promoting devices, electronically controlled robots, clothing electronic devices, and transportation machines.

It should be understood by those skilled in the art that various modifications, combinations, subcombinations and alterations may occur depending on design requirements and other factors insofar as they are within the scope of the appended claims or the equivalents thereof.

What is claimed is:

1. A power supply system for supplying power to a load, comprising:
    a generator section for performing power generation;
    a current converter section that is connected to the generator section and that controls an output from the generator section to be a constant current, thereby to supply the power to the load;
    a charging and discharging control circuit that is coupled to an output from the current converter section and that charges a power storage section in a next stage;
    the power storage section that is connected to the charging and discharging control circuit and that performs charging and discharging; and
    a control section for controlling the output from the current converter section and an output from the charging and discharging control circuit,
    wherein
    when a current value necessary to operate the load is lower than or equal to a current value of the constant current, the power is supplied to the load from the generator section, and the power storage section is charged; and
    when the current value necessary to operate the load is higher than the current value of the constant current, the power is supplied to the load from both the generator section and the power storage section.

2. A power supply system according to claim 1, wherein the generator section is a fuel cell or a solar cell.

3. A power supply system according to claim 1, wherein the power storage section is a secondary cell.

4. A power supply system according to claim 3, wherein the secondary cell is any of a lead battery cell and a lithium-ion secondary cell.

5. A power supply system according to claim 1, wherein the output from the current converter section and the output from the power storage section are each restricted in a current direction to a predetermined direction by current-direction restricting means that restricts the current direction.

6. A power supply system according to claim 5, wherein the current-direction restricting means is a diode.

7. A power supply system according to claim 1, wherein the power storage section includes a voltage converter section that controls an output voltage from the power storage section.

8. A power supply system for supplying power to a load, comprising:
    a generator section for performing power generation;
    a current converter section that is connected to the generator section and that controls an output from the generator section to be a constant current, thereby to supply the power to the load;
    a charging and discharging control circuit that is coupled to an output from the current converter section and that charges a power storage section in a next stage;
    the power storage section that is connected to the charging and discharging control circuit and that performs charging and discharging; and
    a control section for controlling the output from the current converter section and an output from the charging and discharging control circuit,
    wherein
    when a current value necessary to operate the load is lower than or equal to a current value of the constant current, the power is supplied to the load in a current value higher than the current value necessary to operate the load.

9. A power supply system for supplying power to a load, comprising:
    a generator section for performing power generation;
    a current converter section that is connected to the generator section and that controls an output from the generator section to be a constant current, thereby to supply the power to the load;
    a charging and discharging control circuit that is coupled to an output from the current converter section and that charges a power storage section in a next stage;
    the power storage section that is connected to the charging and discharging control circuit and that performs charging and discharging; and
    a control section for controlling the output from the current converter section and an output from the charging and discharging control circuit,
    wherein
    when a current value necessary to operate the load is higher than a current value of the constant current, charging of the power storage section is stopped.

10. An electronic device connected to a power supply system comprising:
- a generator section for performing power generation;
- a current converter section that is connected to the generator section and that controls an output from the generator section to be a constant current, thereby to supply the power to the load;
- a charging and discharging control circuit that is coupled to an output from the current converter section and that charges a power storage section in a next stage;
- the power storage section that is connected to the charging and discharging control circuit and that performs charging and discharging; and
- a control section for controlling the output from the current converter section and an output from the charging and discharging control circuit, wherein when a current value necessary to operate the load is lower than or equal to a current value of the constant current, the power is supplied to the load from the generator section, and the power storage section is charged; and when the current value necessary to operate the load is higher than the current value of the constant current, the power is supplied to the load from both the generator section and the power storage section.

* * * * *